June 5, 1928.

G. L. REICHHELM

FLOW CONTROL MEANS

Filed June 20, 1925   2 Sheets-Sheet 1

1,672,500

Witness:
R. Burkhardt

Inventor:
George L. Reichhelm,
By Wilkinson, Huxley, Byron & Knight
attys

June 5, 1928.  G. L. REICHHELM  1,672,500
FLOW CONTROL MEANS
Filed June 20, 1925   2 Sheets-Sheet 2
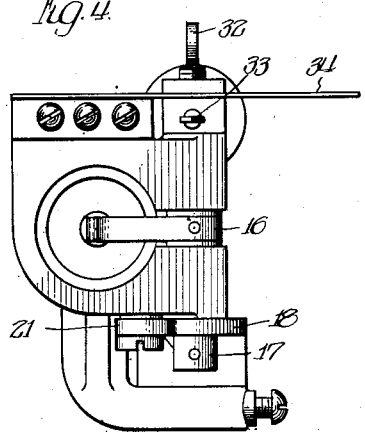
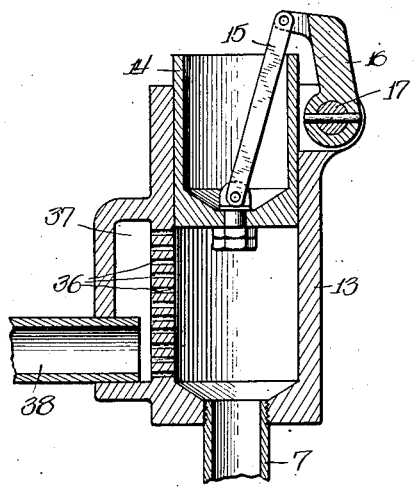
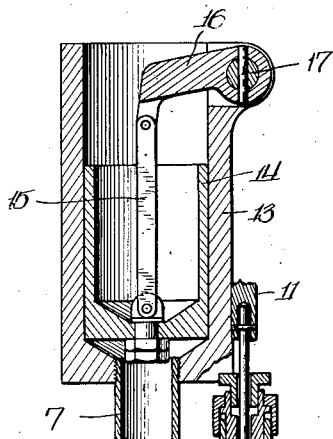
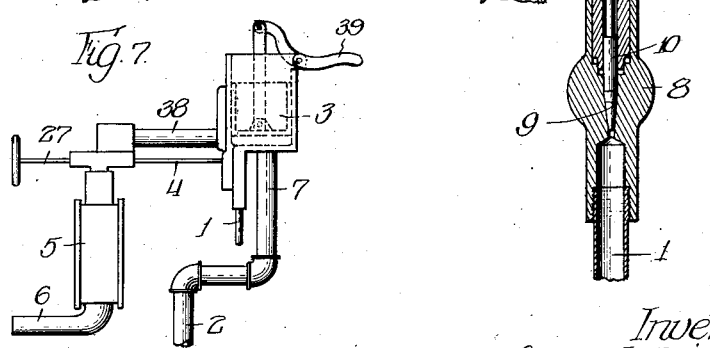
Inventor:
George L. Reichhelm, Patented June 5, 1928.

1,672,500

UNITED STATES PATENT OFFICE.

GEORGE L. REICHHELM, OF ELIZABETH, NEW JERSEY, ASSIGNOR TO THE GASIFIER COMPANY, OF ELIZABETH, NEW JERSEY, A CORPORATION OF NEW JERSEY.

FLOW-CONTROL MEANS.

Application filed June 20, 1925. Serial No. 38,470.

The present invention relates to flow control means.

More particularly the present invention relates to control mechanism for controlling the flow of one fluid in accordance with the pressure of another medium. The present invention will be described in connection with means for varying the flow of oil in response to the pressure of air, the air pressure being preferably that of the air mixed with said oil for the purpose of forming a combustible mixture. The apparatus embodying the principles of the present invention may have different names, but the term "ratiometer" is at present preferred.

An object of the present invention is to provide an improved means for controlling the rate of flow of a fluid in accordance with the pressure of another fluid.

A further object is to provide means for automatically controlling the flow of the fluid in response to the pressure of another fluid and which in the event of the failure of pressure of said other fluid will prevent reestablishment of the flow of said first mentioned fluid until the performance of a predetermined act by the operator.

A further object is to provide an improved means for controlling the supply of two fluids in response to a predetermined function.

A further object is to provide an accurate control means for simultaneously controlling the flow of two fluids in response to the pressure of one of said fluids.

A further object is to provide a flow control means for controlling the flow of one fluid in response to the pressure of another fluid, which means will effectually prevent any flow of said one fluid after the failure of pressure of said other fluid until manually released by the operator.

Further objects will appear as the description proceeds.

Referring to the drawings—

Figure 4 is a top plan view of the structure shown in Figures 2 and 3;

Figure 5 is a sectional view taken along the planes indicated by the arrows 5—5 of Figure 2;

Figure 6 is a view similar to Figure 5 but illustrating a slight modification; and Figure 7 shows a system employing the structure shown in Figure 6.

Figure 1:
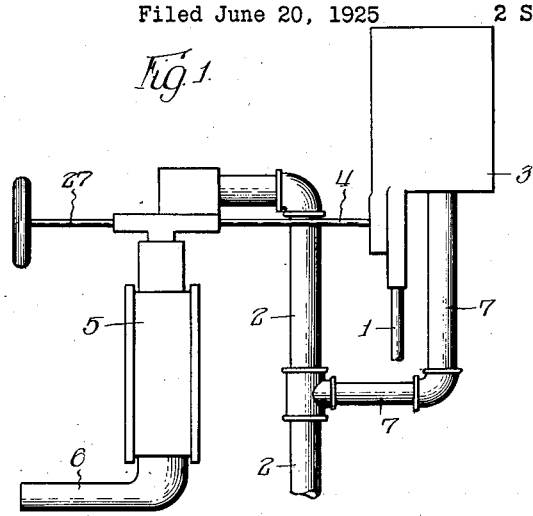
Figure 1 is more or less diagrammatic view of a system employing the principles of the present invention.

Referring to Figure 1, the numeral 1 indicates a supply pipe for supplying a fluid such as oil. The numeral 2 indicates a supply pipe for supplying another fluid, such as air. The supply pipe 1 leads to certain control mechanism embodying the principles of the present invention, which control mechanism is indicated as a whole by the numeral 3. The rate of flow of the oil from the pipe 1 is governed by the control mechanism 3 and is delivered through the supply pipe 4. The supply pipe 4 and supply pipe 2 lead to a device 5, where the oil and air are mixed to form a combustible mixture, which is discharged through the outlet 6. The nature of the device 5 is not important in the consideration of the present invention, but may be a means for gasifying the oil whereby to provide a fixed gas. Branching from the air supply pipe 2 is the pipe 7 leading to the control device 3. The control device 3 operates in response to the pressure of the air or other medium within the pipe 7 and operates to control the flow of oil from the pipe 1 to the pipe 4.

Figure 3:
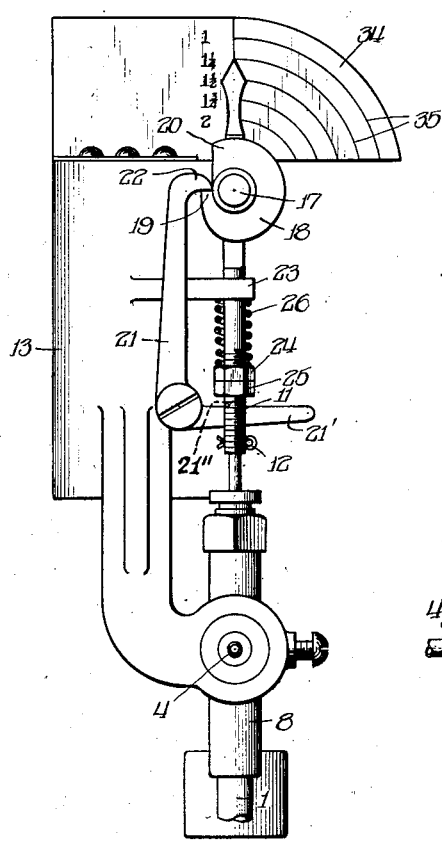
Figure 3 is a view in front elevation of the structure shown in Figure 2.
Figure 2:
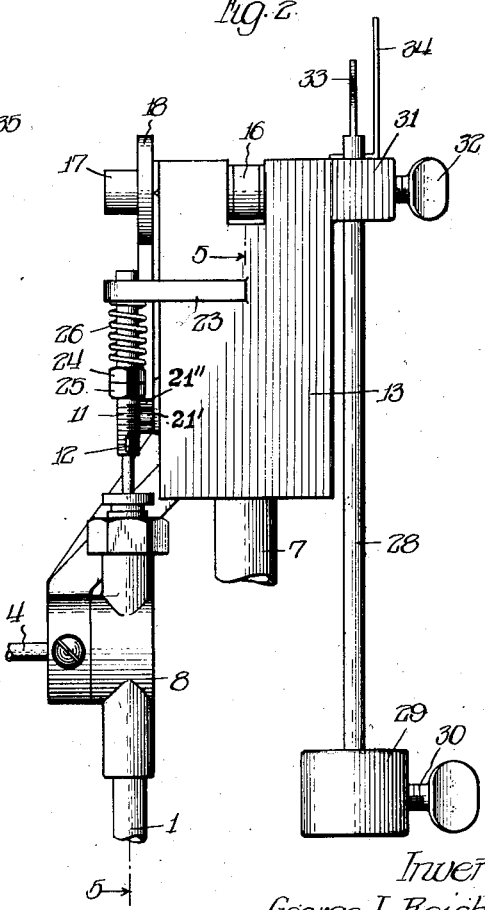
Figure 2 is a view on an enlarged scale of part of the structure shown in Figure 1, said structure being shown in side elevation.

Referring particularly to Figures 2, 3 and 5, it will be noted that the pipe 1 is connected to the valve 8. The valve 8 is provided with a conical seat 9 cooperating with the tapered valve stem 10. Said valve stem 10 is mounted within any preferred packing gland, and controls communication between the inlet pipe 1 and the outlet pipe 4. The valve stem 10 is operated by means of the screw-threaded shaft 11 to which it is attached, as, for example, by means of the split key 12. Reciprocating movement of the shaft 11 is controlled by mechanism which will be described hereinafter.

The numeral 13 indicates a housing which provides a cylinder for a piston 14. Said piston 14 has the link 15 connected thereto, the other end of which link is connected to the lever 16. Said lever 16 is keyed to a shaft 17 having bearings in the housing 13. Reciprocating movement of the piston 14 will communicate a rocking movement to the lever 16 and shaft 17. Said shaft 17 has mounted thereon the cam 18, which cam 18 has a shouldered portion 19 and has a radius which increases progressively from said shouldered portion to the high portion 20 of said cam. Pivoted on the housing 13 is the bell crank lever 21 having the finger portion 22 adapted to hook over the shouldered portion 19 of the cam 18. The arm 21' of said bell crank lever 21 in addition to operating the shaft 11 longitudinally in opposition to the spring 26 provides a convenient manually operable means for releasing the finger portion 22 of said lever from the shouldered portion 19 of said cam 18. The numeral 21" indicates a rounded abutment portion for cooperation with the underside of the nut 25.

The shaft 11 is guided within a boss 23 carried by the housing 13. Said shaft 11 is provided with the nut 24 and the lock nut 25. Between the nut 24 and the boss 23 is a spring 26, which tends to force the shaft 11 downwardly and to thereby urge the tapered valve stem 10 to valve closing position. The auxiliary manually operable valve 27 may be provided for controlling the flow of the mixture of oil from the pipe 4 and air from the pipe 2. The functions of the valve 27 form no part of the present invention, however, and it is not necessary to refer further to said functions.

The shaft 17 is biased to a predetermined position by a weight comprising the rod 28 having the member 29 adjustably mounted thereon, the screw 30 being provided for holding the weight 29 in adjusted position on said rod 28. The rod 28 is adjustable along its own length, and for the purpose of permitting this axial adjustment the shaft 17 has the enlarged portion 31, suitably apertured for the reception of said rod 28. A screw 32 is provided for holding the rod 28 in adjusted position. The upper extremity of the rod 28 is formed to provide a pointer 33 adapted to cooperate with the scale member 34, which is fixed relative to the housing 13. From an inspection of Figure 3 it will be noted that the scale member 34 is provided with a plurality of scales 35—35 concentrically arranged relative to the axis of the shaft 17. By raising or lowering the rod 28 the extremity of the pointer 23 may be brought into cooperative relationship with any of the scales 35—35 on the scale member 34.

The structure illustrated in Figure 6 differs from that shown in Figure 5 in that means is provided for varying the flow of the air to the gasifier 5. According to the structure shown in Figure 6, the housing 13 is provided with a plurality of apertures 36, which communicate with a chamber 37 having the outlet 38. The structure shown in Figure 6 provides means whereby the flow of air may be varied progressively at a varying rate in response to variations in the pressure of the source of air supply. By reason of the structure shown in Figures 6 and 7 a control is had in response to the air pressure not only of the flow of oil but of the flow of air as well.

It will be clear without detailed explanation that a predetermined ratio of oil and air may be had automatically regardless of variations in the pressure of the air supply. Adjustment of the device may readily be made by moving the weight 29 longitudinally of the rod 28. If the air supply should fail, the cam member 18 would be turned in a counterclockwise direction (Figures 3 and 5) by the rod 28 and weight 29 to a position in which the abutment portion 19 of said cam 18 engages with the finger 22 of the lever 21. At this time the spring 26, together with the force of gravity, will cause the closing of the valve stem 10, shutting off the supply of oil from pipe 1 to pipe 4. Said finger 22 will prevent the subsequent operation of cam 18 and will thereby prevent the flow of oil until the attendant releases said lever 21 from said cam 18. In case the flame is extinguished due to failure of the air supply, there will be no danger of a wasteful and perhaps dangerous flow of oil when the source of air supply is again established.

Though both of the illustrated embodiments of the present invention have been described as operating in response to pressure of the fluid within the tube 7, it will be obvious that the shaft 17 may be operated from an independent source, if preferred; as, for example, by a pyrometer control. With such an arrangement the cam 18 and the piston 14 will be moved by such independent control, and the valve 8 and piston 14 will permit variations in the flow of the two mediums through the pipe 4 and the pipe 38.

Figure 7 illustrates diagrammatically a system similar to that shown in Figure 1 but having the joint control (a) of the flow of air from the pipe 7 through the pipe 38 in response to movement of the piston 14, and (b) the control of the flow of oil through the pipe 4 in response to the movement of the valve 8. Said joint control in the diagrammatic view shown in Figure 7 is in response to the control member 39 secured to the shaft 17, which control member may be part of a pyrometer control.

By reason of the structure illustrated a fine adjustment of the needle valve 10 may be had over a wide variation in pressures of air supply. Though a preferred embodiment of the present invention has been described in detail, it will be clear that many modifications will occur to those skilled in the art. It is intended to cover all such modifications that fall within the scope of the appended claims.

What is claimed is—

1. Control means including a fluid conduit, a valve for controlling said conduit, a second fluid conduit, means including a cam responsive to the pressure of the fluid within said second conduit, and means responsive to the movement of said cam for controlling said valve, said cam being provided with an abutment portion adapted to cooperate with said controlling means to prevent the opening of said valve by said means, and means for tripping said controlling means out of operative relationship with said abutment portion.

2. In control mechanism, in combination, a fluid conduit, a valve for controlling said conduit, said valve having spring means for urging said valve to closed position, a second fluid conduit, movable means including a cam responsive to the pressure within said second conduit, and operating mechanism between said cam and said valve by means of which said cam may open said valve in opposition to said spring, said cam being provided with means adapted to have locking engagement with said operating mechanism to prevent the opening of said valve when said operating mechanism is in a predetermined position.

3. Control mechanism including a fluid conduit, a valve for controlling said conduit, a housing providing a cylinder, a movable piston in said cylinder, a second conduit connected with said cylinder whereby pressure variations in said second conduit will control the position of said piston, a cam connected to be moved in response to movement of said piston, adjustable means for opposing movement of said cam, operating mechanism between said cam and said valve, said operating mechanism including a catch member for preventing operation of said operating mechanism by said cam when said cam and said operating mechanism are in a predetermined relationship.

4. Control mechanism including a fluid conduit, a valve for controlling same, adjustable spring means for urging same to closed position, a second fluid conduit, movable means including a cam responsive to the pressure within said second conduit, and operating mechanism between said cam and said valve for opening said valve in opposition to said spring, said cam and said operating mechanism having cooperating portions for preventing the operation of said valve when said cam and said operating mechanism are in a predetermined relation to one another.

Signed at Elizabeth, New Jersey, this 16th day of June, 1925.

GEORGE L. REICHHELM.